(12) United States Patent
Carlson et al.

(10) Patent No.: US 7,475,272 B2
(45) Date of Patent: Jan. 6, 2009

(54) METHOD FOR CALCULATING CLOCK OFFSET AND SKEW

(75) Inventors: Scott M. Carlson, Tucson, AZ (US); Michel Henri Theodore Hack, Cortlandt Manor, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 11/223,577

(22) Filed: Sep. 9, 2005

(65) Prior Publication Data

US 2007/0061607 A1  Mar. 15, 2007

(51) Int. Cl.
*G06F 1/04*  (2006.01)

(52) U.S. Cl. ............ 713/503; 713/500; 370/503; 707/100

(58) Field of Classification Search .......... 713/400, 713/500, 503; 370/503; 707/100
See application file for complete search history.

(56) References Cited

U.S. PATENT DOCUMENTS 6,661,810 B1  12/2003  Skelly et al.

| | | |
|---|---|---|
| 2002/0120416 A1 | 8/2002 | Lin et al. |
| 2002/0188881 A1 | 12/2002 | Lin et al. |
| 2003/0035444 A1 * | 2/2003 | Zwack .................. 370/503 |
| 2005/0234927 A1 * | 10/2005 | Bande et al. ............ 707/100 |

OTHER PUBLICATIONS

David L. Mills, Internet Time Synchronization: The Network Time Protocol, Oct. 1991, IEEE Transactions on Communications, vol. 39, No. 10, pp. 1485-1486.*

* cited by examiner

*Primary Examiner*—Thomas Lee
*Assistant Examiner*—Vincent T Tran
(74) *Attorney, Agent, or Firm*—Scully, Scott, Murphy & Presser, P.C.; John E. Campbell

(57) ABSTRACT

Disclosed is a method for calculating clock offset and skew between two clocks in a computer system. The method comprises the steps of sending data packets from a first processing unit in the computer system to a second processing unit in the computer system, and sending the data packets from the second processing unit to the first processing unit. First, second, third and fourth time stamps are provided to indicate, respectively, when the packets leave the first processing unit, arrive at the second processing unit, leave the second processing unit, and arrive at the first processing unit. The method comprises the further steps of defining a set of backward delay points using the fourth time stamps, and calculating a clock offset between clocks on the first and second processing units and clock skews of said clocks using said set of backward delay points.

2 Claims, 2 Drawing Sheets

METHOD FOR CALCULATING CLOCK OFFSET AND SKEW

CROSS REFERENCE TO RELATED APPLICATIONS

This application is related to copending application Ser. No. 11/223,878 for "Clock Filter Dispersion," filed herewith; application Ser. No. 11/223,876, for "Method And System For Clock Skew And Offset Estimation," filed herewith; and application Ser. No. 11/223,730, for "Filter Turning Point Detection," filed herewith. The disclosures of the above-identified applications are herein incorporated by reference in their entireties.

BACKGROUND OF THE INVENTION

1. Field of the Invention

This invention generally relates to computer systems, and in particular to time synchronization in computer systems. Even more specifically, the invention relates to methods for calculating clock offset and skew between two clocks in a computer system.

2. Background Art

Modern computers use clocks for many purposes, including ensuring that many operations occur in the proper sequence or in synchronization. Because of this, it is important that the clocks themselves operate in close synchronization. Typically, two clocks are often not in perfect synchronization, and there are timing differences between the clocks. In addition, two clocks may not operate at the exact same frequency, so that the timing difference between the clocks changes over time. This change in the timing difference between the clocks is referred to as the clock skew.

Many computer-timing protocols require information such as the estimation of the skew and offset between two clocks. These two clocks may be, for example, a local clock and its source clock. For example, the Server Timing Protocol (STP) requires the estimation of the skew and offset between the local clock and the clock source. The accuracy of the estimation is crucial for the synchronization accuracy of the protocol. While methods and systems to measure clock skew are known, these known procedures tend to be quite complex, unreliable in certain situations, or both.

SUMMARY OF THE INVENTION

An object of this invention is to provide an improved procedure for estimating the clock skew and offset between two clocks in a computer system.

Another object of the present invention is to use both forward delay and backward delay to estimate the skew and offset between two clocks in a computer system.

These and other objectives are attained with a method for calculating clock offset and skew between two clocks in a computer system. The method comprises the steps of sending data packet from a first processing unit in the computer system to a second processing unit in the computer system, and sending the data packets from the second processing unit to the first processing unit. First time stamps are provided to indicate when the packets leave the first processing unit, second time stamps are provided to indicate when the packets arrive at the second processing unit, third time stamps are provided to indicate when the packets leave the second processing unit, and fourth time stamps are provided to indicate when the packets arrive at the first processing unit.

The method comprises the further steps of defining a set of backward delay points using the fourth time stamps, and calculating a clock offset between clocks on the first and second processing units and clock skews of said clocks using said set of backward delay points. Preferably, the set of backward delay point is comprised of $\{T4(i), -BD(i)\}$ where $T4(i)$ are the fourth time stamps, and $-BD(i)$ are backward delay values.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
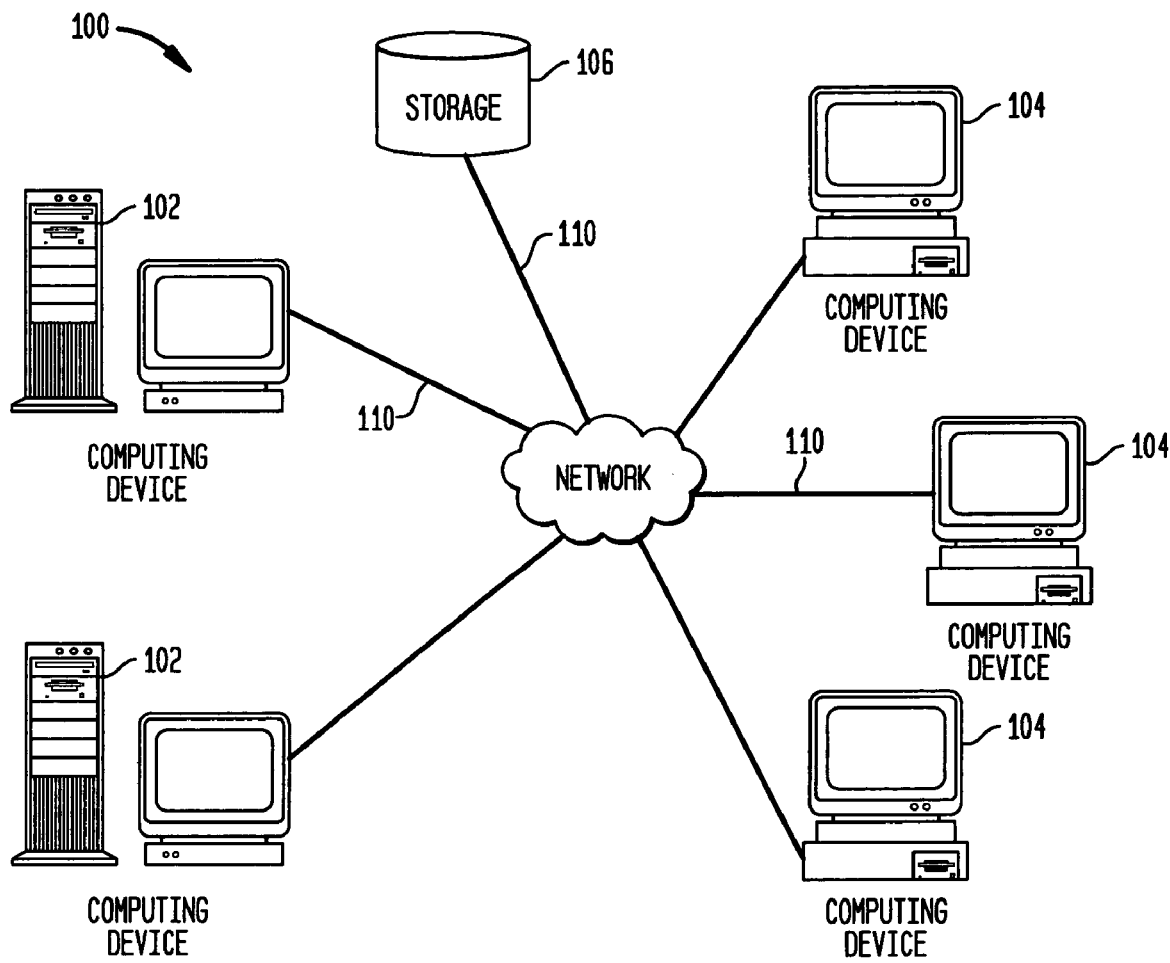
FIG. 1 illustrates a network of data processing systems in which the present invention may be implemented.
Figure 2:
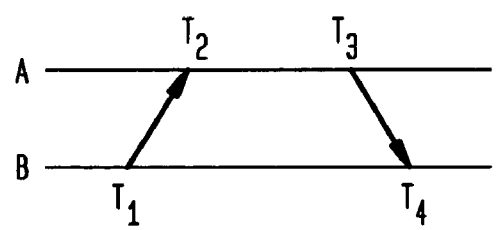
FIG. 2 illustrates a packet exchange between a clock machine B and a clock server A in the network of FIG. 1.

FIG. 1 illustrates a computer network 100, including servers 102, clients 104 and data storage unit 106. Network 100 also includes data connections 110 for transmitting data between the devices of the network. Network 100 may be, for example, the Internet, but could also be an intranet, a local area network a wide area network, point-to-point links, or other networks.

As mentioned above, various computer timing protocols, including the Server Timing Protocol (STP), require calculating the skew and offset between two clocks in computer systems or networks, such as network 100. The present invention is directed to obtaining the clock skew and offset.

Figure 3:
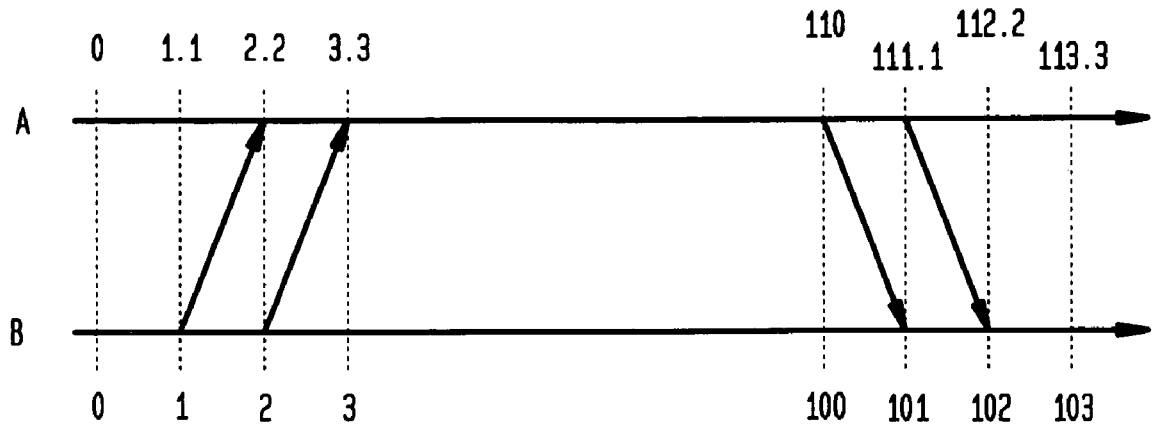
FIG. 3 illustrates a packet exchange between clock machine B and clock server A when clock A is running 10% faster than clock B.

Reference is first made to FIG. 3, which illustrates a packet exchange between a local machine B and a clock server A. The packet leaves B at time T1, according to B's clock. The packet arrives at A at time T2, according to A's clock. Machine A then sends a reply packet at time T3, according to A's clock. The reply message reaches B at time T4, according to B's clock. By sending out this kind of exchange message regularly and recording the sequence of T1, T2, T3, T4 timestamps, one can obtain estimates of the relative offset and speed difference between the clock of machine B and the clock of machine A.

Procedures are known that compute a sequence of forward and backward delays, (FD and BD,) from the sequence of T1, T2, T3, T4 timestamps. For example, such procedures are described in U.S. patent applications Ser. Nos. 09/920,138 and 10/157,610 and in U.S. Pat. No. 6,661,810. In particular, $$FD=T2-T1, BD=T4-T3.$$

Let's use $T1(i)$, $T2(i)$, $T3(i)$, $T4(i)$, $FD(i)$ and $BD(i)$ to denote the timestamps and delays for the $i^{th}$ packet exchange. Prior arts constructs two sets of delay points in the two dimensional plane, $\{(T1(i), FD(i)) | i=1, \ldots \}$ and $\{(T1(i), BD(i)) | i=1, \ldots \}$. U.S. Pat. No. 6,661,810 considers the two sets of points independently, which may not yield accurate results as the present invention. U.S. patent applications Ser. Nos. 09/920,138 and 10/157,610 consider the two sets of delay points jointly, which yield better accuracy than U.S. Pat. No. 6,661,810.

Use T4 Values With Backward Delay

In accordance with the present invention, the T4 timestamp is used to define the set of backward delay points, namely, $\{(T4(i), -BD(i))|i=1, \ldots\}$. Also, the two sets of delay points are considered jointly to obtain better estimates of clock offset and dispersion. Furthermore, the two sets of delay points are considered jointly, in a symmetric way. This symmetric treatment is an advance to the methods in patent applications Ser. Nos. 09/920,138 and 10/157,610.

Although the package delays should be non-negative in real life, it is possible to have delay estimates to be negative if only the T1 timestamps are used. Possible problems due to apparent negative delay can be alleviated by using the T4 timestamp for the backward delay. This advantage will be described through an example. In this example, there is a relatively long delay between T3 and T2.

With reference to FIG. 3, suppose clock A is running 10% faster than clock B. All the forward and backward delays are 1 second according to clock B, or equivalently, 1.1 second according to clock A. Then the forward and backward delays are 2.2−1=1.2 and 101−110=−9 seconds for the first packet. The forward and backward delays are 3.3−2=1.3 and 102−111.1=−9.1 seconds for the second packet. In this case, the estimated round trip delays are 1.2+(−9)=1.3+(−9.1)=−7.8 seconds.

Figure 4:
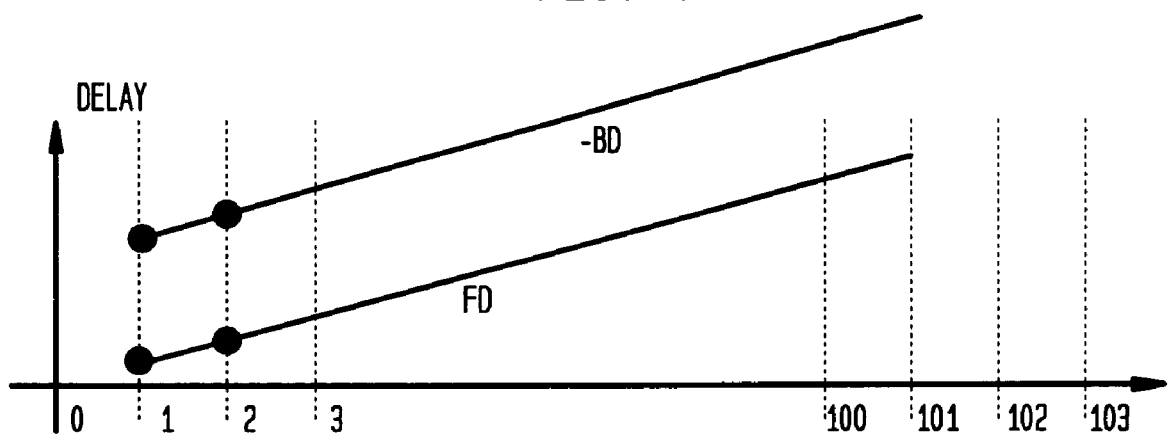
FIG. 4 shows a delay plot when only T1 timestamp is used with backward delay.

In the procedures described in patent application Ser. Nos. 09/920,138 and 10/157,610, when only T1 timestamp is used, the delay plot looks as shown in FIG. 4.

In normal event, the −BD line should be lower than the FD line, with the estimate of the round trip delay being the vertical distance between the two lines. For this example, the estimate of the round trip delay is −7.8 seconds.

Figure 5:
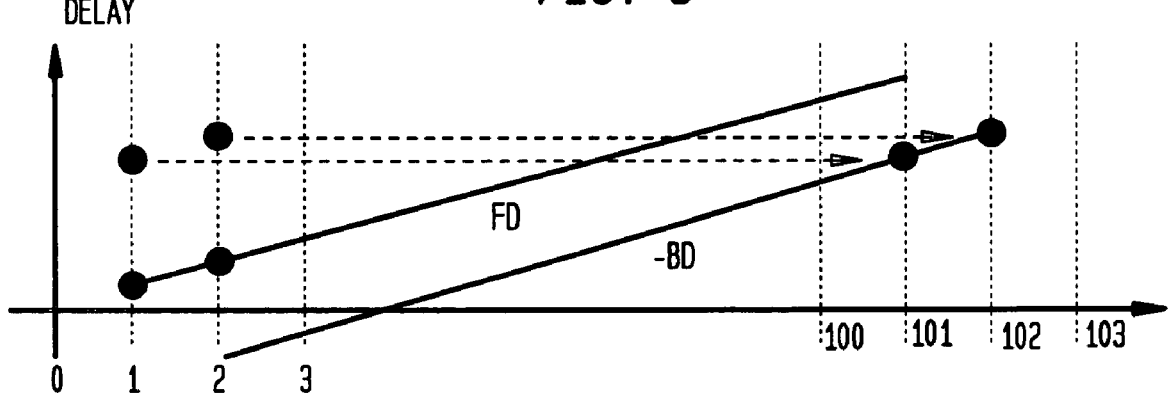
FIG. 5 shows a delay plot when the T4 timestamp is used with backward delay.

If the T4 time stamp is used with backward delay, then the delay plot looks as shown in FIG. 5.

Now the −BD line is lower than the FD line because backward delay points are shifted to the right following the T4 values. The forward delay for the 101st packet is 11.2 seconds. The estimate of the round trip delay is then 11.2+(−9)=2.2 seconds, a positive value.

This kind of negative effect becomes prominent when the packet processing delay, or T3-T2, is significantly longer than the actual packet delays, and the clocks are running at very different speeds. Using T4 timestamps provides a more accurate estimate for the offset and delay values.

As will be readily apparent to those skilled in the art, the present invention can be realized in hardware, software, or a combination of hardware and software. Any kind of computer-server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of calculating clock offset and skew in a computer system, the method comprising the steps of:
   sending data packets from a first processing unit in the computer system to a second processing unit in the computer system;
   sending the data packets from the second processing unit to the first processing unit;
   providing first time stamps to indicate when the packets leave the first processing unit;
   providing second time stamps to indicate when the packets arrive at the second processing unit;
   providing third time stamps to indicate when the packets leave the second processing unit;
   providing fourth time stamps to indicate when the packets arrive at the first processing unit;
   defining a set of backward delay points using the fourth time stamps; and
   calculating a clock offset between clocks on the first and second processing units and clock skews of said clocks using said set of backward delay points; wherein:
   the set of backward delay points comprises $\{T4(i), -BD(i)\}$ where $T4(i)$ are the fourth time stamps, and $-BD(i)$ are backward delay values; and
   each backward delay value is calculated using a respective one set of the time stamps.

2. A method of calculating clock offset and skew in a computer system, the method comprising the steps of:
   sending data packets from a first processing unit in the computer system to a second processing unit in the computer system;
   sending the data packets from the second processing unit to the first processing unit;
   providing first time stamps to indicate when the packets leave the first processing unit;
   providing second time stamps to indicate when the packets arrive at the second processing unit;
   providing third time stamps to indicate when the packets leave the second processing unit;
   providing fourth time stamps to indicate when the packets arrive at the first processing unit;
   defining a set of backward delay points using the fourth time stamps; and
   calculating a clock offset between clocks on the first and second processing units and clock skews of said clocks using said set of backward delay points;
   wherein the step of defining a set of backward delay points includes the step of defining a set of negative backward delay points using the fourth time stamp.

* * * * *